United States Patent [19]

Heubach et al.

[11] 4,412,658

[45] Nov. 1, 1983

[54] METHOD AND A DEVICE FOR MANUFACTURING PARTIALLY OXIDIZED LEAD DUST

[75] Inventors: Rainer Heubach, Goslar; Reinhard Marx, Bad Harzburg; Dieter Hauke, Vienenburg, all of Fed. Rep. of Germany

[73] Assignee: Goslarer Farbenwerke Dr. Hans Heubach GmbH & Co. KG, Langelsheim, Fed. Rep. of Germany

[21] Appl. No.: 253,532

[22] Filed: Apr. 13, 1981

[30] Foreign Application Priority Data

Apr. 18, 1980 [DE] Fed. Rep. of Germany ....... 3015022

[51] Int. Cl.$^3$ .............................................. B02C 17/18
[52] U.S. Cl. ....................................... 241/26; 241/284
[58] Field of Search ....................... 241/18, 19, 26, 30, 241/284, 57, 182, 299, 183

[56] References Cited

U.S. PATENT DOCUMENTS

| | | | |
|---|---|---|---|
| 1,584,149 | 5/1926 | Shimadzu | 241/19 |
| 2,555,171 | 5/1951 | Weston | 241/183 |
| 4,003,164 | 1/1977 | Carpenter, Jr. et al. | 241/183 X |

FOREIGN PATENT DOCUMENTS

| | | | |
|---|---|---|---|
| 954665 | 11/1956 | Fed. Rep. of Germany | 241/183 |
| 360971 | 2/1973 | U.S.S.R. | 241/183 |

*Primary Examiner*—Mark Rosenbaum
*Attorney, Agent, or Firm*—Browdy and Neimark

[57] ABSTRACT

In a process and a device for manufacturing partially oxidized lead dust from lead pieces, the natural pile of dissociated coarse and fine material formed in a rotating drum is mechanically disturbed by radially extending guide plates in the interior of a drum which plates are arranged in pairs and displaced toward each other by 180° in the direction of the circumference of the drum and the individual plates of each pair of plates are spaced axially apart, by which arrangement the efficiency of the process and the product quality are greatly improved.

2 Claims, 4 Drawing Figures

METHOD AND A DEVICE FOR MANUFACTURING PARTIALLY OXIDIZED LEAD DUST

The present invention relates to method and a device for manufacturing partially oxidized lead dust, in which a charge of small pieces of lead is fed along with air to a rotating drum.

In the mill known from U.S. Pat. No. 1,584,149 a charge of small pieces of lead is moved in a drum by rotation of the latter, whereby very fine-grained rubbed-off dust results which is removed from the mill by air. This air is either blown into the mill through nozzles or is sucked through the mill. The lead dust produced in this manner is used particularly in the manufacture of accumulators. However, this mode of operation requires a very high degree of energy consumption. Moreover, it has not been possible heretofore to construct and control plants with an output of more than 250 to 300 kg/h.

Mill methods are also known which operate according to the sieving residue method. In these cases extensive variation of the size of the manufacturing installations is possible—mills with a lead throughput of 30 to 1,200 kg/h are known—and a more favorable degree of energy consumption can be achieved as compared with the air mills, at least in the case of large units. However, the quality of the dust produced is considerably lower for accumulator manufacture as regards its degree of fineness and its degree of oxidation.

The transformation of lead pieces to oxidized lead dust is known from U.S. Pat. No. 1,584,149, in which case the lead pieces are rotated together with balls of steel in a pebble mill and a current of air is blown into the mill. This known method is not suitable for sufficiently contacting with air the dust gathering in the dead zones, and the only disturbance of the natural piling up of material is caused by the rotation of the reactor drum. The rate of production achieved by this method is unsatisfactory, amounting to only 100 kg/h.

It is therefore the object of the present invention to develop a method and a device which combine the advantages of the mill methods described, that is to say, which produce partially oxidized lead dust, exhibiting optimum quality for battery manufacture due to its degree of fineness and its degree of oxidation, and which operate with favorably low energy consumption to produce as high an output rate as possible.

In accordance with the present invention, this object is solved by mechanically disturbing the natural pile of material forming in the drum in such a way that the dust is exposed to the air.

Detailed research has shown that, in the case of the known drums, coarse and fine material will dissociate inside the rotating pile, in which case the fine material may become concentrated both inside and at the periphery of the pile, depending on the degree of filling and speed of rotation of the drum. It is, however, particularly important for the air to be able to reach the parts of the pile where the rubbed-off dust is concentrated, for the purpose of oxidation and to act as a carrier gas. This has proved to be the case only with the small air drums known heretofore, and it remains unsatisfactory in the case of larger drums working on the same principle, even with the most favorable adjustment of all variables. The result is that the method becomes unbalanced and uncontrolled.

By means of the present invention it is advantageously possible to control the air drum process in such a way that drums of almost all sizes can be securely run in stationary equilibrium under a wide range of adjustments of all variables, such as degree of filling, speed of rotation, size of pieces, air throughput, and temperature. Due to the fact that the natural pile is disturbed mechanically, it is ensured that the air will come into contact with the lead dust, irrespective of how the drum is run.

By way of example, the drum may be rotated eccentrically.

In accordance with a second embodiment of the present invention, the device for carrying out the invention may be embodied such that guide plates or baffles are attached to the inner wall of the drum. These guides plates or baffles, which of course rotate along with the drum wall, will, when rotating, disturb the natural pile inside the drum in such a way that the air can reach the lead dust. It is of particular advantage to arrange the guide plates in pairs and displaced towards each other by 180° in the direction of the circumference of the drum, in which case the individual guide plates of each pair of plates are spaced axially a certain distance apart. An unbalanced state of the drum is avoided in this way, and the desired number of pairs of guide plates disposed towards each other can be arranged so as to produce the best results.

In accordance with a third embodiment, radially extending baffles or guide plates may be attached to a shaft which extends coaxially into the drum. Problems with unbalanced states of the drum are excluded in this manner.

The drum may, however, also be mounted eccentrically.

One embodiment example of the invention will now be explained with reference to the drawing, in which:

FIG. 1 shows a drum 1 which is mounted, for instance, on four rollers and which is rotated by a motor (not shown). Guide plates or baffles 2 are arranged inside this drum, and, when rotating said drum, these baffles continuously disturb the natural piling up of the material placed in the drum, said material consisting of lead pieces and rubbed-off dust.

Figure 1:
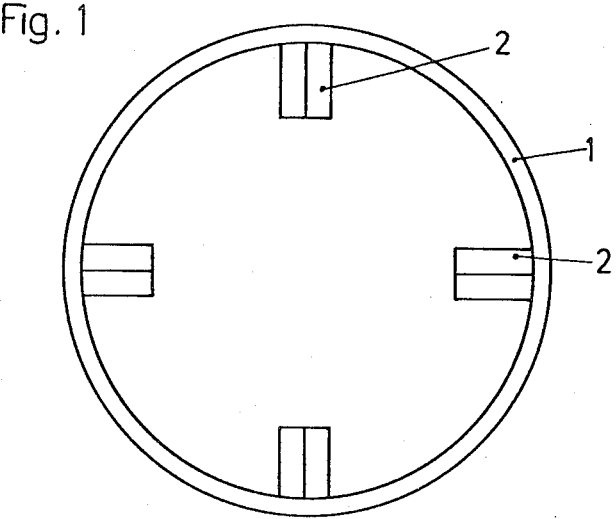
FIG. 1 is a cross-sectional view of a drum.
Figure 2:
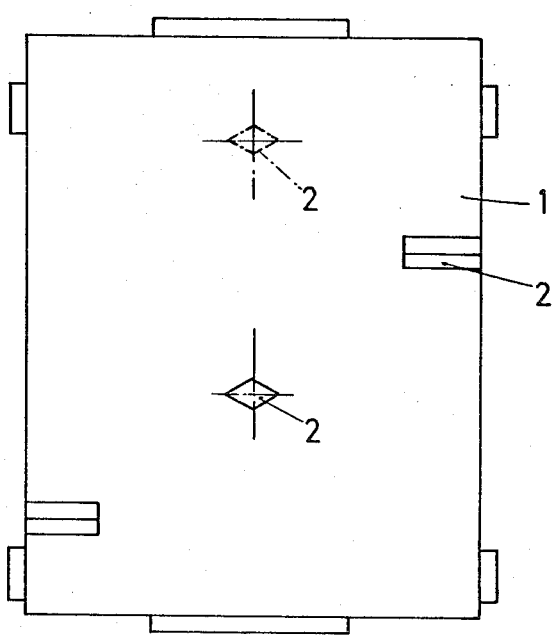
FIG. 2 is a longitudinal sectional view of a drum.

As the longitudinal section shown in FIG. 2 illustrates, the guide plates 2 of an opposite pair are arranged in axial distance apart. In the embodiment example illustrated, four guide plates 2 are provided, and these guide plates 2 extend from the wall of the drum into the interior in a manner which is sufficient to always disturb the pile. The peripheral distance between a pair of guide plates 2 amounts, as shown in FIGS. 1 and 2, to 180°, and the individual baffles or guide plates 2 of each pair are spaced axially apart.

Figure 3:
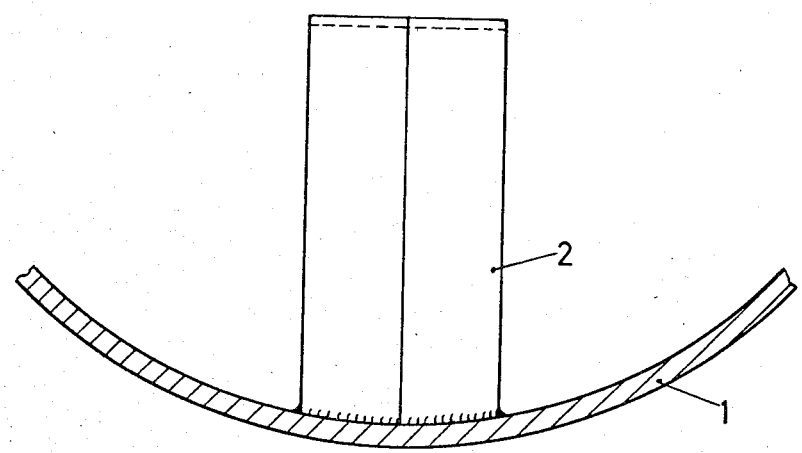
FIG. 3 is an enlarged view of a guide plate or baffle.
Figure 4:
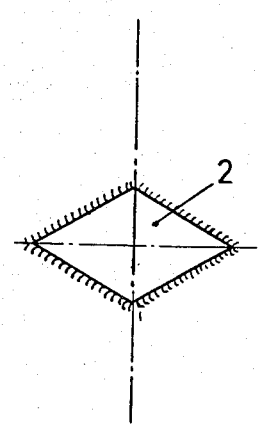
FIG. 4 is a sectional view of this baffle.

As shown in FIG. 3, the guide plate 2 is, by way of example, welded to the inner wall of the drum and has, as shown in FIG. 4, a rhomboidal cross-section. The superiority of the inventive method and inventive device over that known heretofore will now be illustrated by means of the following product and output table.

|  | Output kg/h | Specific Energy Consumption kWh/t | Product Quality | |
|---|---|---|---|---|
|  |  |  | Specific Surface $m^2/g$ | Acid Absorbency g $H_2SO_4$/kg |
| Conventional Air Mill | max. 300 | 300 | 2.5 | 250 |
| Sieving Residue Mill | max. 1,200 | 155 | 1.8 | 220 |
| Inventive Mill | e.g. 1,200 | 110 | 3.0 | 270 |

The following advantages must be added to those already obvious from the above table:

(1) The degree of oxidation of the dust can be adjusted as desired within wide limits (50 to 75%) and can be maintained with a narrow tolerance (±1%).

(2) Lead types of the highest purity (e.g. fine lead in accordance with German Industrial Standard DIN 1719) can be processed, whereas in the case of other mills it is necessary to use lead which is doped with an oxidation accelerator.

(3) A higher degree of fineness of the dust produced with the inventive mill means that a considerable amount of material can be saved in the manufacture of accumulators, i.e. less material is needed to achieve a given battery capacity or a higher battery capacity is achieved with the same amount of material.

What is claimed is:

1. A method for manufacturing partially oxidized lead dust from lead pieces, comprising:
   feeding a charge of small pieces of lead, along with air, to a rotatable drum;
   rotating said drum so that said small pieces of lead are crushed to form lead dust;
   mechanically disturbing the lead dust within said rotating drum in addition to dust movement caused by drum rotation alone so that the air within said rotating drum will contact substantially all of the lead dust to produce partially oxidized lead dust,
   wherein mechanically disturbing the lead dust is caused by bar-like guide plates radially extending into said rotating drum and being arranged in pairs and displaced towards each other by 180° in the direction of the circumference of the drum, the guide plates of each pair of plates being axially apart.

2. A method according to claim 1 wherein said step of mechanically disturbing is further caused by eccentric rotation of the drum.

* * * * *